(12) United States Patent
Laing

(10) Patent No.: US 7,759,836 B2
(45) Date of Patent: Jul. 20, 2010

(54) COIL MODULE FOR A STATOR OF AN ELECTRIC MOTOR, STATOR, ELECTRIC MOTOR, CIRCULATION PUMP AND METHOD OF MANUFACTURING A STATOR

(75) Inventor: Karsten Laing, Althuette (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/315,371

(22) Filed: Dec. 1, 2008

(65) Prior Publication Data
US 2009/0146524 A1    Jun. 11, 2009

Related U.S. Application Data

(63) Continuation of application No. PCT/EP2007/004809, filed on May 31, 2007.

(30) Foreign Application Priority Data

Jun. 2, 2006    (DE) .................. 10 2006 026 681

(51) Int. Cl.
*H02K 3/04*    (2006.01)
(52) U.S. Cl. ........................ 310/208; 310/194
(58) Field of Classification Search ................. 310/194, 310/208, 261.001, 254.1, 258–260, 261.1
See application file for complete search history.

(56) References Cited

U.S. PATENT DOCUMENTS

| | | | |
|---|---|---|---|
| 4,728,268 A | 3/1988 | Laing | |
| 4,992,688 A | 2/1991 | Cap et al. | |
| 5,267,842 A | 12/1993 | Harmsen et al. | |
| 5,920,134 A | 7/1999 | Mayer et al. | |
| 5,997,261 A | 12/1999 | Kershaw et al. | |
| 6,087,755 A * | 7/2000 | Suzuki et al. | ......... 310/216.091 |
| 6,097,129 A | 8/2000 | Furtwängler et al. | |
| 6,194,806 B1 * | 2/2001 | Suzuki et al. | ............... 310/269 |
| 6,350,105 B1 | 2/2002 | Kobayashi et al. | |
| 6,404,095 B1 * | 6/2002 | Hsu | ....................... 310/254.1 |
| 6,599,104 B2 | 7/2003 | Saito et al. | |
| 6,897,596 B2 | 5/2005 | Laing | |
| 7,408,282 B2 * | 8/2008 | Stewart | ............... 310/216.132 |
| 7,569,965 B2 * | 8/2009 | Miyashita et al. | ........... 310/194 |
| 7,581,307 B2 * | 9/2009 | Stewart et al. | ................. 29/596 |
| 2002/0062656 A1 | 5/2002 | Suitou et al. | |
| 2004/0028539 A1 | 2/2004 | Williams et al. | |
| 2004/0119371 A1 | 6/2004 | Laing | |
| 2004/0160142 A1 | 8/2004 | Marioni | |
| 2005/0141888 A1 | 6/2005 | Laing | |
| 2005/0141889 A1 | 6/2005 | Laing | |
| 2006/0071569 A1 | 4/2006 | Stewart et al. | |

FOREIGN PATENT DOCUMENTS

DE    33 42 967    6/1985

(Continued)

*Primary Examiner*—Thanh Lam
(74) *Attorney, Agent, or Firm*—Lipsitz & McAllister, LLC

(57) ABSTRACT

A coil module for a stator of an electric motor comprising a coil holder, a coil that is disposed on the coil holder, a first web and a second web is provided, wherein situated between the first web and the second web are a first coil portion and a second coil portion for contacting with a motor circuit.

47 Claims, 10 Drawing Sheets

FOREIGN PATENT DOCUMENTS

| | | |
|---|---|---|
| DE | 87 12 486 | 12/1987 |
| DE | 88 11 420 | 1/1989 |
| DE | 43 26 391 | 2/1995 |
| DE | 44 35 511 | 2/1996 |
| DE | 196 46 617 | 5/1998 |
| DE | 102 36 700 | 2/2004 |
| DE | 103 04 398 | 8/2004 |
| DE | 103 22 366 | 8/2004 |
| EP | 0 456 169 | 11/1991 |
| EP | 0 357 913 | 9/1992 |
| EP | 0 945 967 | 9/1999 |
| EP | 1 026 507 | 8/2000 |
| EP | 1 361 368 | 11/2003 |
| EP | 1 416 607 | 5/2004 |
| EP | 1 437 819 | 7/2004 |
| EP | 0 913 310 | 5/2006 |
| JP | 11 234948 | 8/1999 |
| WO | 2004/042891 | 5/2004 |

\* cited by examiner

COIL MODULE FOR A STATOR OF AN ELECTRIC MOTOR, STATOR, ELECTRIC MOTOR, CIRCULATION PUMP AND METHOD OF MANUFACTURING A STATOR

This application is a continuation of international application number PCT/EP2007/004809 filed on May 31, 2007.

The present disclosure relates to the subject matter disclosed in international application number PCT/EP2007/004809 of May 31, 2007 and German application number 10 2006 026 681.1 of Jun. 2, 2006, which are incorporated herein by reference in their entirety and for all purposes.

BACKGROUND OF THE INVENTION

The invention relates to a coil module for a stator of an electric motor.

The invention relates further to a stator for an electric motor.

The invention further relates to an electric motor.

The invention relates moreover to a circulation pump.

The invention moreover relates to a method of manufacturing a stator.

From EP 1 416 607 A2 an electric motor is known, which comprises a rotor and a stator, wherein the rotor is spherically mounted and of a spherical design facing the stator. The stator has a magnetic return body, which is manufactured from a compressed powder material. The magnetic return body is at least in segments of a spherical design facing the rotor.

SUMMARY OF THE INVENTION

In accordance with the present invention a coil module is provided, with the aid of which a stator can be manufactured in a simple manner.

In accordance with an embodiment of the invention, a coil holder is provided, a coil is provided, which is disposed on the coil holder, a first web is provided and a second web is provided, wherein between the first web and the second web a first coil portion and a second coil portion are situated for contacting with a motor circuit.

The coil can be manufactured on the coil holder in a simple manner in particular by winding. The coil in turn can easily be brought into electrical contact with contact points of the motor circuit by means of the first coil portion and the second coil portion, which are held on the first web and the second web. The coil module can be mounted for example onto locating pins of a magnetic return body, wherein given a corresponding arrangement of the contact points the coil portions already lie adjacent to the contact points. They may then be brought from above into electrical connection with the contact points for example by welding or soldering.

By means of the coil module according to the invention a stator can be manufactured with a high degree of automation. In particular, an electrical contacting of coils by means of a robot, such as for example a welding robot, is possible.

It is advantageous if the coil is wound on the coil holder. The coil can therefore be manufactured in a simple manner.

In particular, the coil holder is designed in such a way that the coil can be manufactured on the coil holder by means of a winding machine. It is therefore possible to manufacture the coil holder with a high degree of automation.

It is advantageous if the first coil portion lies in the region of a first wire end of the coil. The coil portion is therefore easy to manufacture between the first web and the second web and contacting can be established in a simple manner.

For the same reason, it is advantageous if the second coil portion lies in the region of a second wire end of the coil.

The first coil portion and/or the second coil portion can easily be fastened to the first web and/or second web by means of a winding. For this purpose, the corresponding coil wire is wound at least once around the corresponding web. There is then no need to provide additional fastening elements. The corresponding coil module is easy to manufacture.

In particular, the first web and/or second web have at least one recess for receiving a winding. Thus, the first coil portion and the second coil portion can easily be manufactured at the desired position on the coil module.

It is advantageous if the first web and the second web lie substantially parallel to one another. It is therefore possible to establish an electrical contacting with the corresponding contact point over a relatively large surface region, wherein, particularly if a plurality of coil modules are provided, the coil modules can be arranged in a space-saving manner on the stator.

It is advantageous if the first coil portion and the second coil portion lie transversely of the first web and the second web. This provides a free space, through which the first coil portion and the second coil portion can be electrically contacted with corresponding contact points. Through this free space a robot for example can effect the welding or soldering operation.

For the same reason, it is advantageous if the first coil portion and the second coil portion lie transversely of a coil axis. This makes it possible to provide coil portions that can be laid flat onto corresponding contact points in order to effect electrical contacting in a simple and rapid manner.

The first web and the second web are advantageously oriented transversely of a coil axis in order to be able to clamp coil portions between the two webs.

In one embodiment, the first web and the second web differ in length. This allows a plurality of coil modules to be arranged distributed around an axis.

For example, the first coil portion and the second coil portion lie at an angle to one another, wherein preferably the outer coil portion lies at an angle to the first web and the second web. This leads to a space-saving arrangement, wherein a large contact area is provided for the contacting with a contact point.

It is quite particularly advantageous if the first coil portion and the second coil portion are electrically contactable from above with contact points. This allows automatic contacting in particular by means of a robot. The corresponding stator is therefore easy to manufacture with a high degree of automation.

It is advantageous if the coil holder is designed in such a way that it is mountable onto a coil holder receiver of the stator. A coil module can therefore easily be fastened for example to a magnetic return body of the stator.

It is advantageous if the coil holder has a recess, into which a locating pin (of the stator) can engage. The coil module can therefore be mounted onto the locating pin in order easily to effect a fixing for example on a magnetic return body of the stator.

In one embodiment, the coil holder has a base element and a top element, which overlap the coil. It is therefore easy to produce a winding on the coil module.

It is advantageous if the first web and the second web are disposed on the base element. The first web and the second web may therefore be positioned for example in a recess of a holding base of a magnetic return body.

In one embodiment, there is disposed on the base element a flange, which has a direction of extent parallel to a coil axis and on which the first web and the second web are seated.

By means of the flange a gap can be produced between the webs and an underside of the coil. It is therefore possible to dispose the webs in a recess for example of a holding base of a magnetic return body of the stator. This in turn allows easy contacting for example with a contact printed circuit board.

In one embodiment, an anti-rotation device is provided for the rotational fixing on the stator. In this way, a rotationally fixed arrangement of a coil module on the stator and at the same time an automatically correct alignment of the coil module on the stator can be achieved.

In an, in terms of production engineering, simple embodiment the anti-rotation device is formed by means of at least one pin and/or one pin receiver. The pin can engage into a pin receiver for example on a contact printed circuit board and/or a pin of the contact printed circuit board may engage into the pin receiver in order to effect a locking against rotation.

In an advantageous embodiment, the first web and the second web are seated integrally on the coil holder. In particular, the coil module is manufactured integrally outside the coil.

For example, the coil holder and/or the coil module minus coil is made of a plastics material. Such a coil holder can be manufactured for example by injection moulding.

It is advantageous if the coil holder has a winding core that is of a cylindrical construction. In the winding core a through-recess may be formed in order to allow the coil module to be mounted onto a locating pin. As a result of the cylindrical construction of the winding core, a coil can easily be manufactured at a winding machine.

In accordance with the invention, a stator for an electric motor that is easy to manufacture is provided.

In accordance with an embodiment of the invention, a magnetic return body is provided, on which at least one coil module according to the invention is disposed.

The stator according to the invention has the advantages already described in connection with the coil module according to the invention.

In particular, the first coil portion and the second coil portion are electrically connected to respective contact points and are connected in particular by welding or soldering. This allows the contacting to be established in a simple and in particular automated manner.

It is advantageous if the contact points are disposed on a printed circuit board. The printed circuit board is a component that is separate from the magnetic return body, wherein by means of the contact points an electrical contact with the motor circuit can easily be provided.

In one embodiment, the printed circuit board is disposed below the magnetic return body. The electrical contact is then established through a recess of the magnetic return body.

It is advantageous if the printed circuit board has, associated with the at least one coil module, at least one pin receiver and/or at least one pin for forming an anti-rotation device, wherein at least one pin of the coil module is introduced into the at least one pin receiver and/or the at least one pin of the printed circuit board is introduced into at least one pin receiver of the coil module. A coil module can therefore easily be fastened in a rotationally fixed manner to the magnetic return body, wherein the coil module can also easily be correctly aligned.

It is quite particularly advantageous if the magnetic return body has at least one locating pin, on which the at least one coil module is disposed. The coil module can be mounted onto the locating pin and thereby positioned on the magnetic return body.

In one embodiment, the magnetic return body has a plurality of locating pins that are arranged distributed around an axis. The stator has a number of coils corresponding to the number of locating pins.

It is advantageous if the locating pin comprises a first region, on which the associated coil module is seated, and a second region, which lies above the coil module. An electric motor with low transverse dimensions can therefore be manufactured.

In particular, a plurality of locating pins are provided, the second regions of which have as a common surface envelope a spherical surface segment. This makes it easy to manufacture a stator that is of a spherical construction at least in segments facing a rotor of the electric motor. For example, there can be positioned on the second regions pole shoes, which are magnetic return elements and have a spherical surface.

It is advantageous if the magnetic return body has a holding base, on which the at least one locating pin is disposed. Such a magnetic return body is easy to manufacture. Coil modules can easily be positioned on such a magnetic return body.

In particular, the holding base and the at least one locating pin are integrally connected to one another. This makes it possible to minimize the manufacturing steps.

It is quite particularly advantageous if the magnetic return body is manufactured from a compressed powder material. Such a powder material comprises in particular iron grains that are electrically isolated from one another. The corresponding magnetic return body has only low eddy-current losses, with optimized magnetic properties; in particular there is a high permeability combined with low electrical conductivity. The magnetic return body can moreover be constructed in an optimized geometric shape.

It is advantageous if the holding base has a recess, in which the first web and the second web of the at least one coil module lie. It is therefore easy to connect the coil of the at least one coil module to contact points. The contact points in this case are disposed in or below the recess.

For example, the holding base takes the form of a ring. The webs of the at least one coil module are positioned in the recess.

In accordance with the present invention, an electric motor is provided, which comprises a rotor and a stator and which is easy to manufacture.

In accordance with an embodiment of the invention, the stator comprises a plurality of coil modules.

The advantages of the electric motor according to the invention have already been described in connection with the stator according to the invention and the coil module according to the invention.

In particular, the rotor by means of one or more permanent magnets is a magnetic field-generating rotor. Along with a compact style of construction it is therefore possible to achieve high efficiency.

It is advantageous if the rotor is positioned above the coils. In this way, while optimising the magnetic flux a compact style of construction particularly with regard to transverse dimensions can be achieved.

In one embodiment, it is provided that the rotor is spherically mounted. In this way, a bearing arrangement with low wear and low noise generation is provided.

It is advantageous if the stator is of a spherical design at least in segments facing the rotor. In particular, for this purpose one or more pole shoes are disposed on the magnetic return body. The pole shoes may be disposed integrally on the magnetic return body or they may be separate elements.

For example, one or more pole shoes are disposed on a top on the stator. By virtue of the top the stator is easy to manufacture. The pole shoes can be positioned and fastened on the top.

It is advantageous if the rotor is of a spherical design facing a spherical region of the stator. In this way, it is possible to provide an electric motor of optimized efficiency.

The electric motor is in particular electronically commutated and comprises a magnetic field-generating rotor and a position measuring device having at least one sensor. By means of the position measuring device the rotor can be positioned. For this purpose, the rotor position first has to be detected by means of at least one sensor.

It is advantageous if there is associated with the at least one sensor a flux guiding device, by means of which a rotor signal can be transmitted to the at least one sensor. The provision of a flux guiding device allows the sensor to be disposed in principle at any desired position. The flux guiding device ensures that a high enough signal level is provided. This allows the sensor to be positioned in particular at an optimized position for manufacture of the electric motor. For example, the sensor is positioned on a main printed circuit board of a motor circuit or on an additional printed circuit board in the vicinity of the main printed circuit board. Thus, the sensor can also be easily supplied with electrical energy and the signal removal can be realized in a simple manner.

It is advantageous if the flux guiding device is in signal-effective connection with the at least one sensor and the rotor. In this way, a strong enough rotor signal is supplied to the sensor, even if the sensor is disposed remote from the rotor.

In particular, the flux guiding device is manufactured from a paramagnetic material such as for example soft iron. This allows the magnetic flux to be transmitted.

In an, in terms of production engineering, advantageous embodiment the flux guiding device takes the form of a lamina. Such a flux guiding device is easy to position. For example, the flux guiding device is positioned in a recess for the purpose of fastening it.

In one embodiment, the flux guiding device has a first side and an opposite, second side, between which the flux line extends, wherein the thickness of the flux guiding device between the first side and the second side is smaller than a width and length of the flux guiding device. The flux guiding device can accordingly be manufactured as a thin lamina, which is easy to position.

It is advantageous if the first side and/or the second side are substantially planar and are parallel to one another. A corresponding flux guiding device can be manufactured with low thickness dimensions and is easy to position.

It is advantageous if the flux guiding device comprises a signal pick-up head region and a conducting region. The signal pick-up head region is used to pick up the rotor signal, i.e. pick up magnetic flux. The conducting region is used to supply the picked-up signal to the sensor.

Advantageously, the signal pick-up head region is widened compared to the conducting region in order to ensure an optimized signal injection.

It is quite particularly advantageous if the signal pick-up head region is adapted in shape to an interface between the rotor and the stator. In this way, an optimized signal injection is obtained, wherein the flux guiding device is easy to position.

It is advantageous if the at least one sensor is disposed remote from an interface between the stator and the rotor. It can then be positioned at a suitable point, wherein this point is so selected that manufacture is simplified and for example lines leading to and from the sensor can be manufactured with a low outlay.

It is advantageous if the at least one sensor is disposed below the interface between the stator and the rotor. This simplifies manufacture of the electric motor.

In particular, the at least one sensor is disposed in a region below or above the rotor. This simplifies manufacture because the sensor need no longer be disposed directly on to the rotor.

In one embodiment, the at least one sensor is disposed on a carrier, on which main components of a motor circuit are disposed. Thus, electrical energy can easily be supplied to the sensor and sensor signals can easily be derived and supplied for example to an evaluation circuit of the position measuring device. The sensor may be positioned, with manufacture of the carrier, integrally for example by means of component insertion.

It is then advantageous if the carrier is disposed in a second chamber of a housing, which second chamber is separate from a first chamber of the housing, in which first chamber the stator and the rotor are disposed.

In an alternative embodiment, the at least one sensor is disposed on an additional carrier, which is separate from a carrier, on which main components of a motor circuit are disposed. This additional carrier is positioned at an optimum point for manufacture.

It is advantageous if there is associated with the stator an interface that faces the rotor and is of a spherical design. The corresponding electric motor may be operated with high efficiency.

It is then advantageous if the flux guiding device associated with the at least one sensor has a spherical or cylindrical end, which is directed towards the rotor. This allows the flux guiding device to be positioned in an optimum manner. Given a spherical design of the stator, at least in segments facing the rotor, the end can be of a cylindrical construction if the flux guiding device is correspondingly thin.

In one embodiment, there is associated with the stator at least one pole shoe, which is directed towards the rotor. The pole shoe is used to provide a magnetic return device.

It is then advantageous if a plurality of pole shoes are disposed on a top that is seated on the stator. By means of the top the pole shoes can easily be positioned.

It is then advantageous if the top has spaced-apart intermediate webs, on which the pole shoes are disposed. By means of the intermediate webs the pole shoes can be positioned and fastened and held at a spacing.

The flux guiding device can easily be disposed at least partially on an intermediate web. For example, an intermediate web has a recess for example in the shape of a slot, in which the flux guiding device is at least partially seated.

The electric motor according to the invention is used in particular in a circulation pump.

In one embodiment, the circulation pump comprises an electric motor with a stator, a rotor and a motor circuit, as well as a housing, in which the electric motor is disposed. The housing has a first chamber, in which the stator and the rotor are disposed, and a second chamber, which is separate from the first chamber and at which at least one carrier is positioned, on which at least part of the motor circuit is disposed. The first chamber and the second chamber are connected by at least one connection opening, by means of which at least one electrical element of the motor circuit, which is disposed on the at least one carrier, is in thermal contact with the stator in the first chamber.

The stator can be cooled by means of conveyed liquid of the circulation pump (such as for example water). For example, the conveyed liquid has a maximum temperature in the region of between 95° C. and 110° C. The stator may develop temperatures lying in the region of ca. 130° C. It is therefore possible to achieve effective cooling.

If one or more electrical elements of the motor circuit are in thermal contact with the stator via the connection opening, then they can be cooled by means of the conveyed liquid, i.e. a fluid cooling is provided. This allows an effective removal of heat. For example, electronic power components of the motor circuit are correspondingly cooled.

By means of the solution according to the invention it is possible to position in the second carrier (which forms a "switchgear cubicle" for the electric motor) a carrier, on which both low-temperature circuit elements and high-temperature circuit elements can be positioned. The low-temperature circuit elements generate less heat than the high-temperature circuit elements. The low-temperature circuit elements can be cooled by air cooling. The high-temperature circuit elements can be cooled by means of the conveyed liquid owing to the thermal contact with the stator.

In particular, the stator in the first chamber may be cooled by means of conveyed liquid. This means that the at least one electrical element of the motor circuit that is in thermal contact with the stator via the connection opening can also be cooled by means of conveyed liquid.

It is further provided that the second chamber can be air-cooled.

It is advantageous if the at least one carrier has a low-temperature region and a high-temperature region, wherein the low-temperature region is air-cooled and the high-temperature region is cooled by means of conveyed liquid. It is therefore possible to dispose on the same carrier both low-temperature circuit elements, for which air cooling is sufficient, and high-temperature circuit elements that are cooled by means of conveyed liquid. The corresponding circulation pump can be manufactured in a simple and economical manner. In particular, economical low-temperature circuit elements can be used.

It is quite particularly advantageous if electrical elements of the low-temperature region are disposed on a side of the at least one carrier that are [sic] remote from the first chamber. This ensures an effective thermal decoupling, wherein the carrier lies between the first chamber and the electrical elements.

It is then also advantageous if electrical elements of the high-temperature region are disposed on a side of the at least one carrier that faces the first chamber. In this way, thermal contact with the stator seated in the first chamber can easily be achieved.

It is quite particularly advantageous if there is situated between the first chamber and the second chamber an interspace for forming an air gap. By means of this interspace an air gap separation is provided between the first chamber and the second chamber. In this way, the first chamber and the second chamber can be thermally decoupled.

It is advantageous if the interspace is open towards the exterior. This allows air to flow through the interspace in order to provide air cooling. Furthermore, by means of the air in the interspace thermal decoupling between the first chamber and the second chamber is provided.

The at least one connection opening is advantageously closed relative to the interspace and is therefore closed relative to the exterior.

It is advantageous if the interspace comprises an air gap. By means of the air gap the first chamber and the second chamber are thermally decoupled. It is therefore possible for example to cool electrical elements, which are disposed on the carrier in the first chamber, by air cooling if they generate only a low amount of heat.

It is quite particularly advantageous if a low-temperature region of the at least one carrier lies (directly) below the air gap. This ensures an effective thermal decoupling between electrical elements of the low-temperature region and the first chamber.

In one embodiment, the second chamber lies below the first chamber. This makes it easy to achieve thermal contacting between the at least one element of the rotor circuit and the stator.

It is advantageous if the first chamber has in the direction of the second chamber an end wall. This end wall closes off the first chamber.

For the same reason, it is advantageous if the second chamber has in the direction of the first chamber an end wall that is spaced apart from the end wall of the first chamber. By means of the spaced-apart end walls it is possible to produce an interspace between the two chambers that is used for air gap separation.

In one embodiment, the end wall of the first chamber at an inner side has a recess for receiving a contact printed circuit board of the stator. The inner side of the end wall of the first chamber is used in particular for positioning the stator in the first chamber. In the recess a contact printed circuit board may be positioned, by which coils of the stator are connected electrically to the motor circuit.

It is quite particularly advantageous if the housing is of an integral construction. It is manufactured in particular from plastics material for example by injection moulding. In this way, the assembly steps for manufacture of the circulation pump are kept low.

It is advantageous if in the first chamber positioning devices for the stator are disposed. During manufacture of the circulation pump the stator may be positioned and in particular centred in the first chamber by means of the positioning elements. This simplifies manufacture.

In accordance with the present invention, a method of manufacturing a stator for an electric motor that is easy to carry out is provided.

In accordance with an embodiment of the invention, a coil module according to the invention is manufactured, the at least one coil module is disposed on a magnetic return body, and the first coil portion and the second coil portion are welded or soldered to contact points of a printed circuit board that is associated with the stator.

The association of the printed circuit board with the stator means that during manufacture the printed circuit board is fixed relative to the stator, wherein the fixing can be effected to the stator itself or by means of a manufacturing device. In this case, it is in principle possible that after establishing the electrical contact between the coil of the at least one coil module and the printed circuit board the mechanical fixing of the printed circuit board relative to the stator is effected by means of the welding or soldering to establish the electrical contact.

The method according to the invention can be carried out with a high degree of automation. In particular, a robot (for example a welding robot) can be used to establish the electrical contact between the coil of the at least one coil module and the printed circuit board.

Manufacture of the coil can moreover be automated by manufacturing the coil on the at least one coil module by means of a winding machine.

The following description of preferred embodiments serves in connection with the drawings to provide a detailed explanation of the invention.

DETAILED DESCRIPTION OF THE INVENTION

Figure 1:
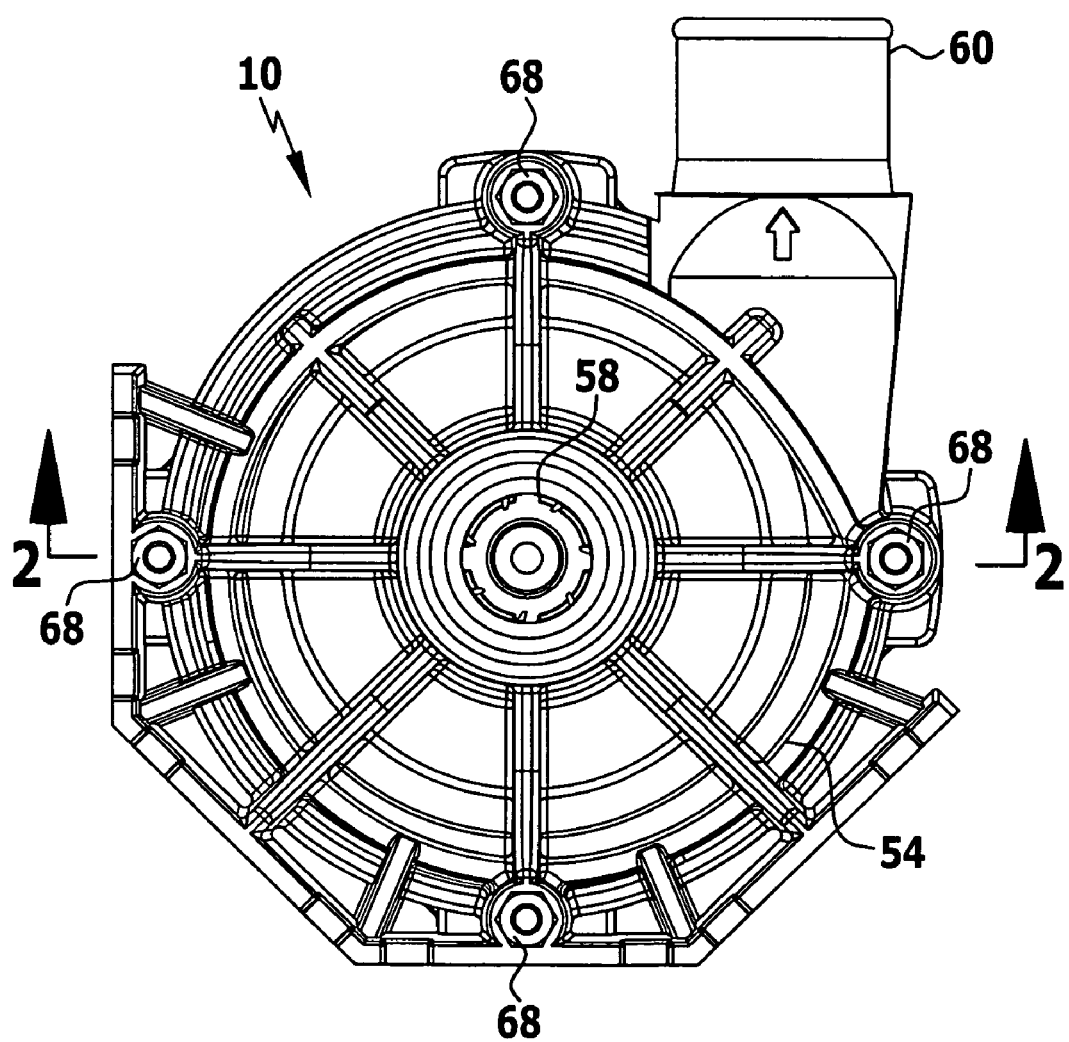
FIG. 1 shows a plan view of an embodiment of a circulation pump according to the invention.
Figure 2:
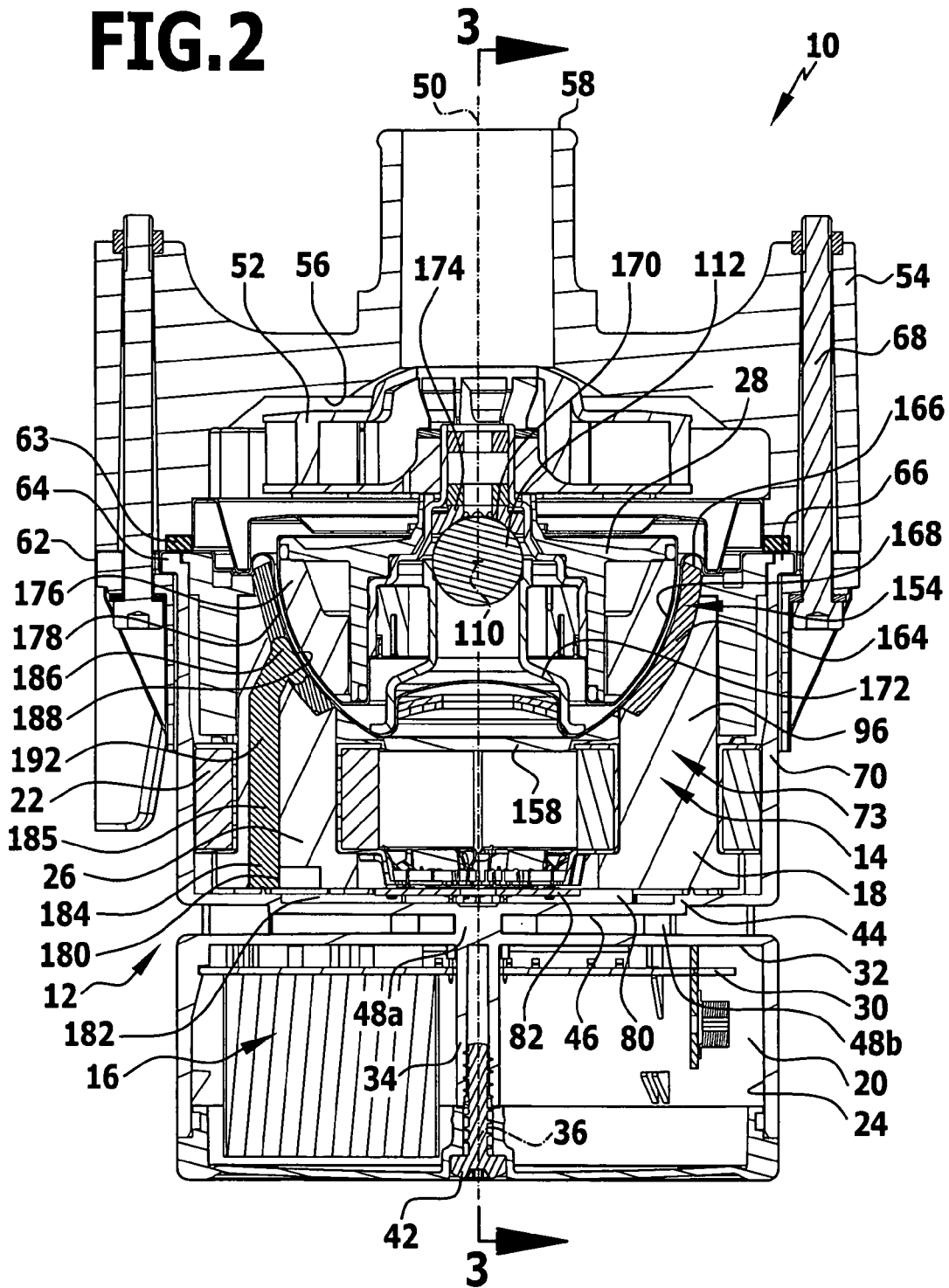
FIG. 2 shows a sectional view along the line 2-2 according to FIG. 1.
Figure 3:
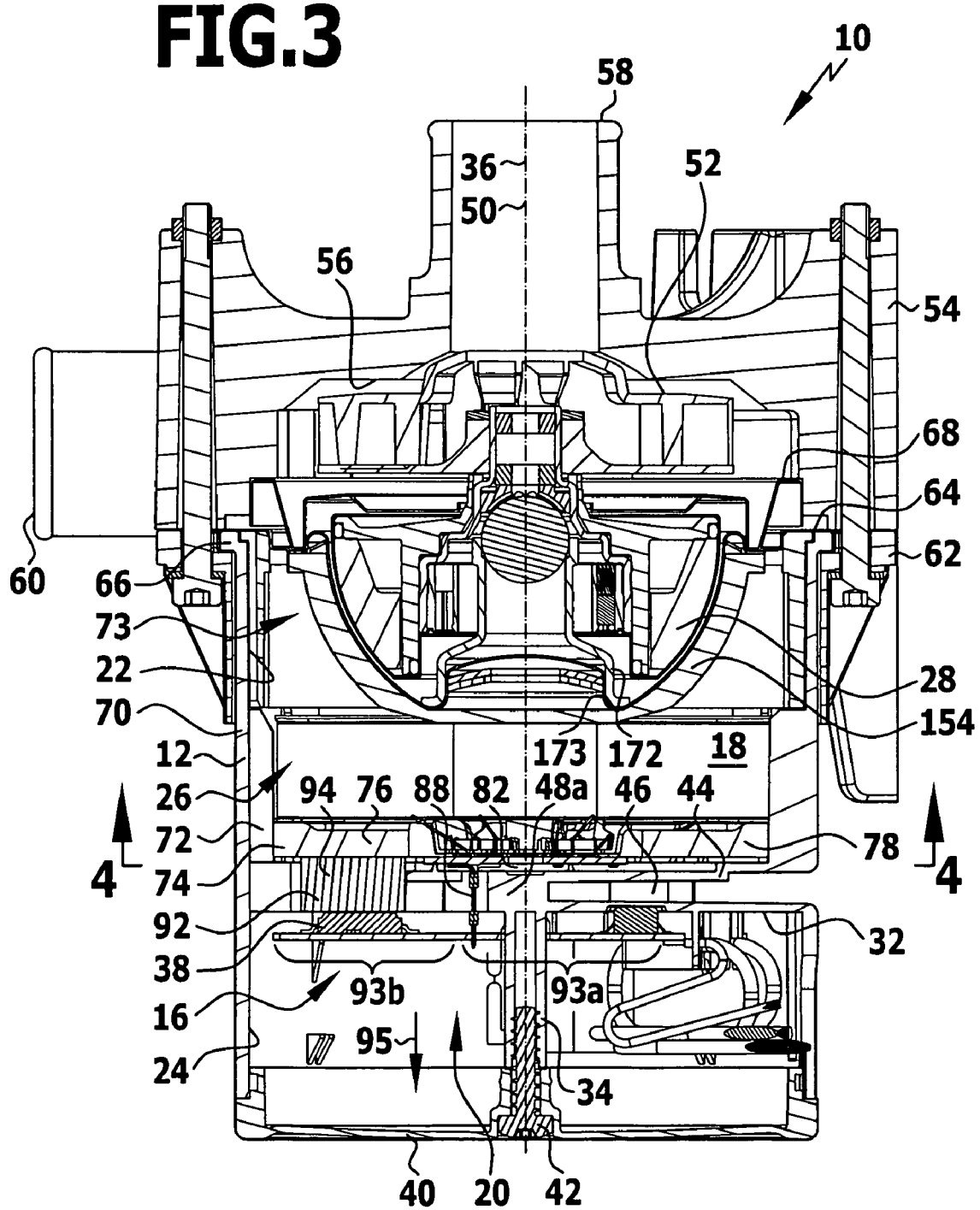
FIG. 3 shows a sectional view along the line 3-3 according to FIG. 2.

An embodiment of a circulation pump according to the invention, which is shown in FIGS. 1 to 3 and denoted there by 10, comprises a housing 12. Disposed in the housing 12 is an electric motor 14 with an electric motor circuit 16.

The housing 12 has a first chamber 18 and a second chamber 20 separate from the first chamber 18. The first chamber 18 has a substantially cylindrical interior 22. The second chamber 20 likewise has a substantially cylindrical interior 24.

In the first chamber 18 a stator 26 and a rotor 28 of the electric motor 14 are disposed.

Disposed in the second chamber 20 is a carrier 30, which in particular is a carrier printed circuit board, on which the motor circuit 16 or at least main components of the motor circuit 16 are seated. The second chamber 20 serves as a "switchgear cubicle" for the electric motor 14.

In the direction of the first chamber 18 the second chamber 20 has an end wall 32. Seated on the end wall 32 and pointing into the interior 24 is a pin element 34. This pin element 34 is in particular disposed coaxially with a centre line 36 of the housing 12. Preferably, the first chamber 18 and the second chamber 20 have a centre line that coincides with the centre line 36. The carrier 30 is fixed on the pin element 34 at a distance from the end wall 32.

Disposed on the carrier 30 are electric circuit elements and connection lines for example in the form of printed conductors. These are in particular discrete circuit elements and integrated circuit elements. The motor circuit 16 comprises one or more electronic power circuit elements 38, such as for example one or more thyristors, which are disposed on the carrier 30.

The second chamber 20 is closed in an outward direction by a cover element 40 that is fastened for example by means of a screw 42 to the pin element 34.

The first chamber 18 has in the direction of the second chamber 20 an end wall 44. This end wall 44 is spaced apart from the end wall 32 of the second chamber 20. Formed between the end wall 44 and the end wall 32 is an interspace 46 that is open towards the exterior and comprises an air gap.

Disposed between an outer side of the end wall 32 and an outer side of the end wall 44 in this case are web elements 48a, 48b etc., which hold the end wall 44 and the end wall 32 apart, simultaneously forming the interspace 46.

The housing 12 is preferably of an integral construction. In particular, the end walls 32 and 44 are constructed integrally with corresponding chamber walls.

The second chamber 20 with the motor circuit 16 is air-cooled. By means of the interspace 46 the second chamber 20 is thermally isolated from the first chamber 18, wherein air may flow through the interspace 46 and/or an air cushion lies in the interspace 46.

The rotor 28 is rotatable about an axis of rotation 50 that coincides with the centre line 36. Connected in a rotationally fixed manner to the rotor 28 is an impeller 52 for conveying a liquid.

Disposed on the housing 12 is a top cover element 54, which has a recess 56, in which the impeller 52 is rotatable. The top cover element 54 comprises a first connecting piece 58 that is aligned for example coaxially with the centre line 36. Through this first connecting piece 58 conveyed liquid is introducible into the interior 56. By means of the first connecting piece 58 a suction side of the circulation pump 10 is defined.

There is further disposed on the top cover element 54 a second connecting piece 60 (FIGS. 1 and 3), which is oriented for example transversely and in particular at right angles to the centre line 36. Through this second connecting piece 60 conveyed liquid can be discharged. The second connecting piece 60 defines a discharge end of the circulation pump 10.

The top cover element 54 is fastened to the housing 12 for example by means of a flange 62. For this purpose, the housing 12 at its upper end 64 remote from the second chamber 20 has an outwardly projecting annular region 66. The flange 62 lies against the annular region 66 from below. By means of clamping elements 68, such as for example screws or bolts, the top cover element 54 is clamped with the flange 62, which in particular takes the form of an annular flange, and is therefore held against the housing 12, wherein a fluid-proof fastening is established by means of an O-ring 63.

Figure 4:
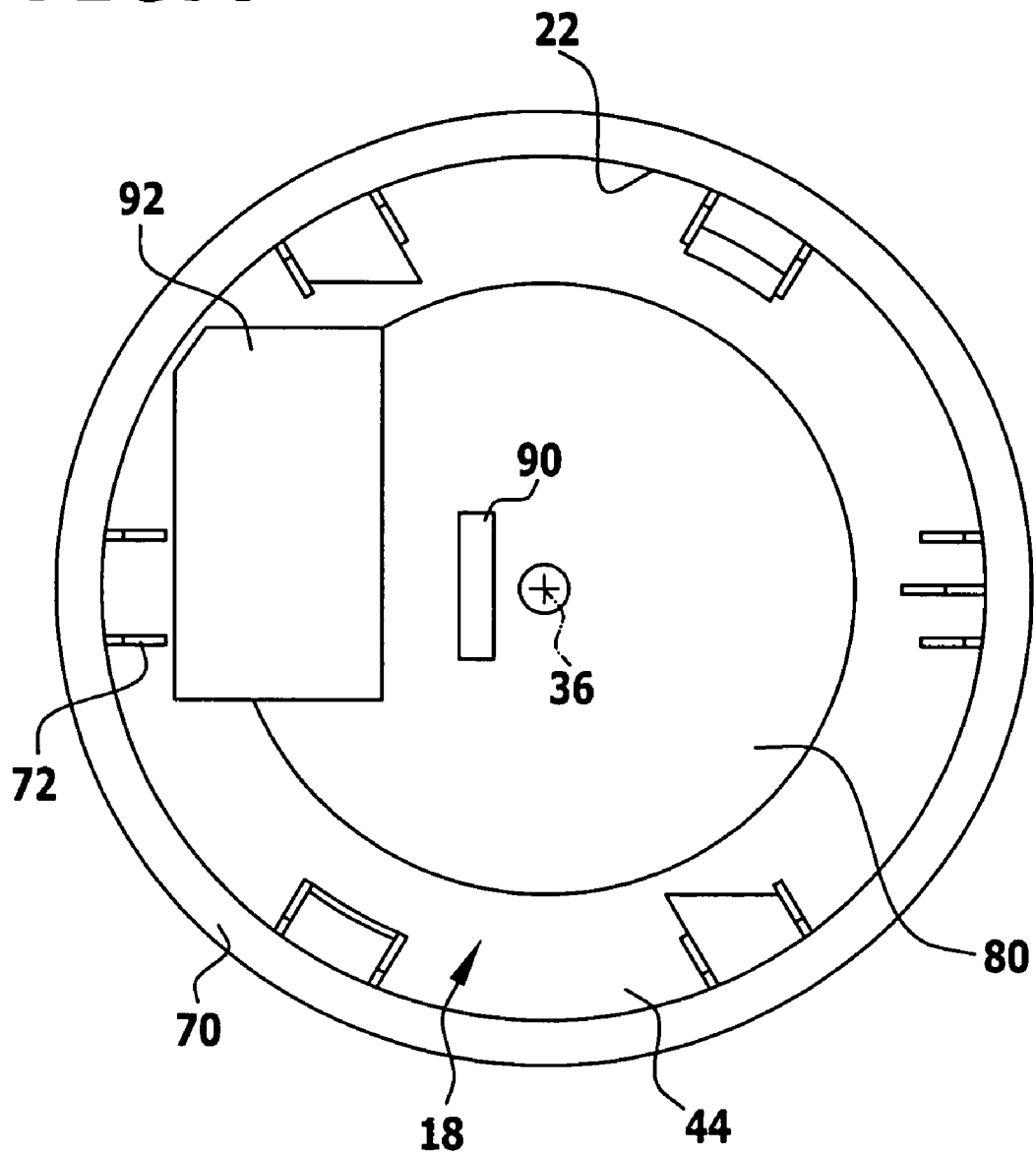
FIG. 4 shows a sectional view along the line 4-4 according to FIG. 3.
Figure 5:
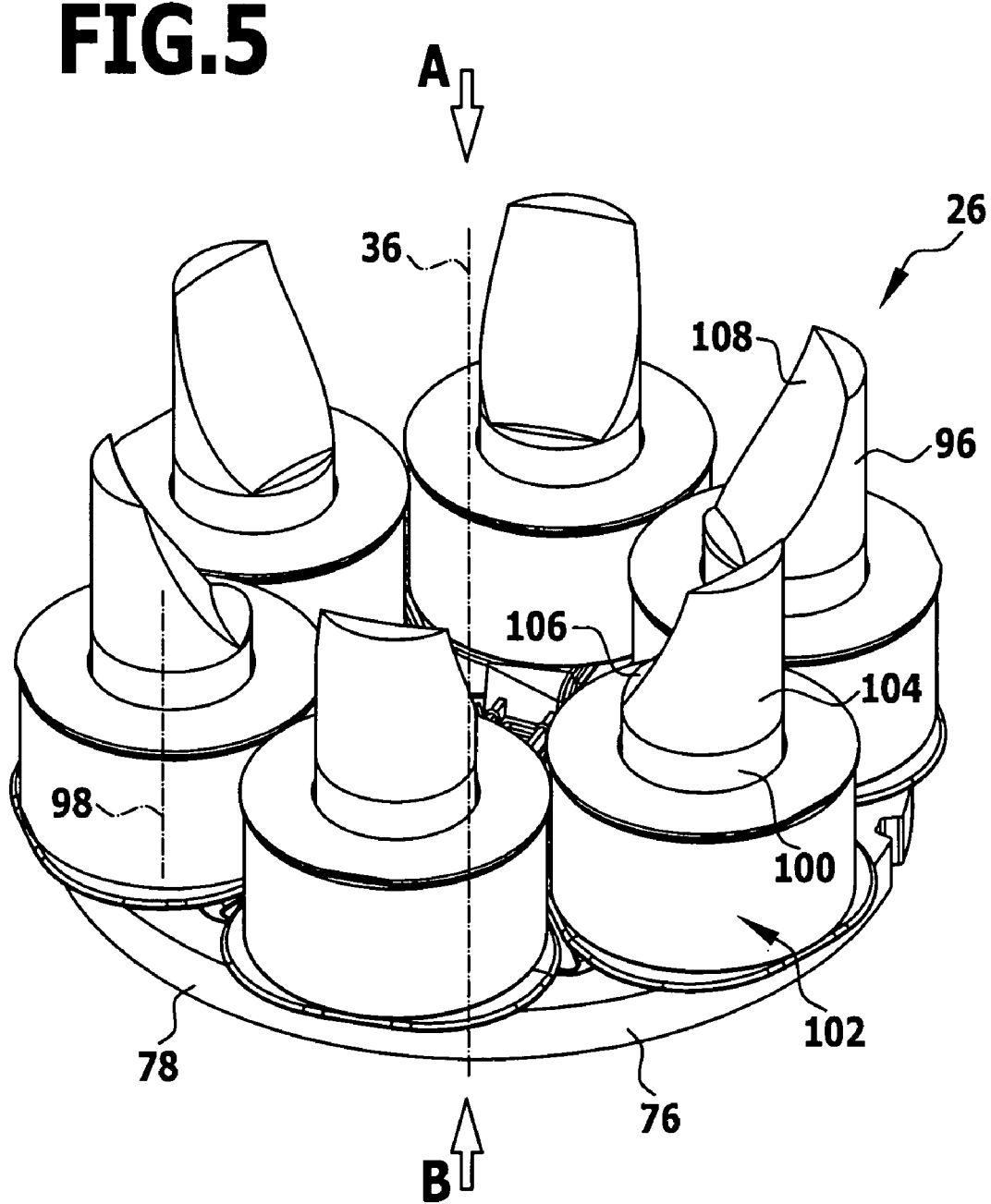
FIG. 5 shows a perspective partial representation of an embodiment of a stator according to the invention.

Positioning elements 72 are disposed on a chamber wall 70 and directed into the interior 22 of the first chamber 18 (FIGS. 3, 4). These positioning elements 72 are designed for example as ribs. For example, as shown in FIG. 4, a plurality of rib pairs are arranged on the chamber wall 70 so as to be distributed around the centre line 36. These positioning elements 72 are used to position the stator 26 during manufacture of the circulation pump 10.

The stator 26 comprises a magnetic return device 73 comprising a magnetic return body 74 and pole shoes. This magnetic return body 74 is in particular of an integral construction. It is manufactured preferably from a compressed powder material, which comprises for example iron grains that are electrically isolated from one another. Such a powder material is known by the name of "SOMALOY" from the company Höganäs, Sweden. In this way it is possible to keep eddy-currents in the magnetic return body 74 low. The requisite magnetic properties (high permeability) are present with an optimized geometric configurability of the magnetic return body 74.

The magnetic return body 74 comprises a holding base 76, which in particular takes the form of a ring 78. By means of this holding base 76 the stator 26 is positioned against an inner side of the end wall 44.

The end wall 44 has a, for example circular, recess 80 (indentation) directed towards the interior 22 (FIG. 4). Disposed in this recess 80 is a contact printed circuit board 82.

This contact printed circuit board 82 has contact points 84a, 84b etc. (FIG. 6), at which in each case a coil 86 of the stator 26 is electrically connected, in particular by welding or soldering, to the contact printed circuit board 82.

The contact printed circuit board 82 with its contact points 84a, 84b etc. is in turn connected by one or more electric connection lines 88 (FIG. 3) to the motor circuit 16. For this purpose, in the end wall 32 and the end wall 44 a through-opening 90 is disposed (FIG. 4), through which the connection line 88 extends from the first chamber 18 into the second chamber 20. The opening 90 is closed in the direction of the interspace 46 by means of an outer wall.

Between the first chamber 18 and the second chamber 20 a connection opening 92 is further provided (FIG. 4). This connection opening 92 is closed in the direction of the interspace 46 by means of a surrounding wall 94 (FIG. 3).

Disposed on the carrier 30, which is in turn fastened in the second chamber 20, are electric circuit elements that are positioned in the second chamber 20 and are air-cooled. Further disposed on the carrier 30 are electronic power circuit elements 38, which are at least partially positioned in the first chamber 18. They project through the connection opening 92 into the first chamber 18 and are in thermal contact with the stator 26 and in particular with the magnetic return body 74.

The stator 26 may be cooled effectively by the conveyed liquid that is conveyed by the circulation pump 10. For example, the stator 26 reaches a temperature of ca. 130° C. Water conveyed by means of the circulation pump 10 reaches a maximum temperature of ca. 95° C. to 110° C. The part of the motor circuit 16 that has a high heat production (in particular electronic power circuit elements 38) is in thermal contact with the stator 26 via the connection opening 92 in order to utilize the cooling effect of the conveyed liquid at the stator 26.

The first chamber 18 and the second chamber 20 are in this case separated by the interspace 26 by means of an air gap.

The carrier 30 is divided into a low-temperature region 93a and a high-temperature region 93b, wherein the low-temperature region 93a is air-cooled and the circuit elements of the high-temperature region 93b are cooled by means of the conveyed liquid. Circuit elements of the high-temperature region 93b are in thermal contact with the stator 26 and project away from the carrier 30 in the direction of the first chamber 18. Circuit elements of the low-temperature region 93a project away from the carrier 30 in the opposite direction 95, i.e. away from the first chamber 18 in the direction of the cover element 42, in order to ensure an effective thermal decoupling. The low-temperature region 92a is disposed directly below the air gap of the interspace 46.

The contact printed circuit board 82 is seated below the magnetic return body 74 in the recess 80.

The holding base 76 is aligned coaxially with the centre line 36. On the holding base 76 a plurality of locating pins 96 are seated uniformly distributed around the centre line 36 (FIGS. 5 to 8). The locating pins 96 (locating teeth) are all equidistant from the centre line 36. What is more, adjacent locating pins 96 are uniformly spaced apart from one another. Piercing points of axes 98 of the locating pins 96 on the holding base 76 define a regular polygon. In the embodiment shown in FIG. 5 the stator 26 comprises six coils 86. The regular polygon in this example is a hexagon, wherein the angular distance between adjacent locating pins 96 is 60°. The axes 98 of the locating pins 96 are oriented in each case parallel to the centre line 36.

The locating pins 96 are integrally connected to the holding base 76.

Figure 9:
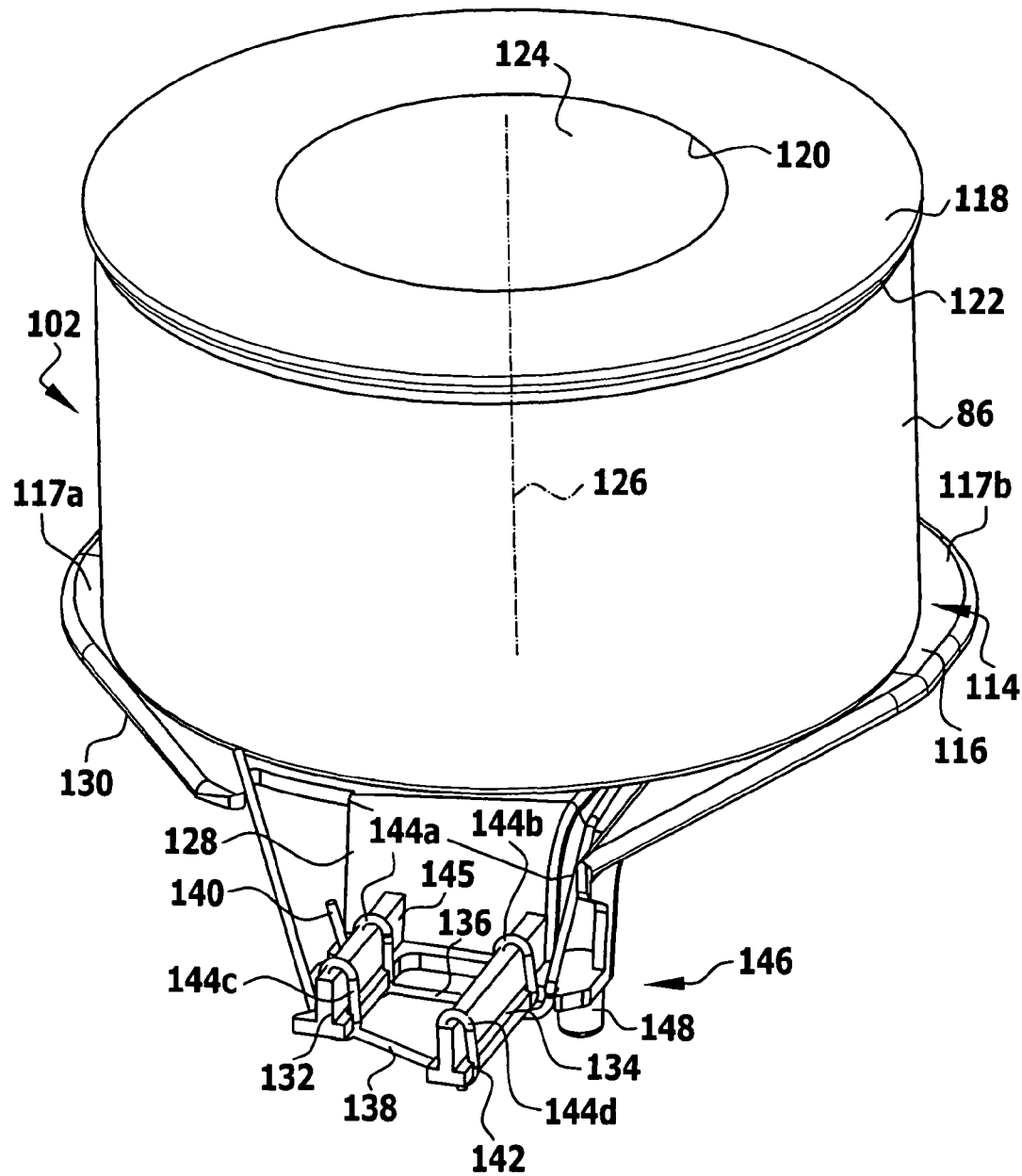
FIG. 9 shows a perspective representation of an embodiment of a coil module according to the invention.

A locating pin 96 comprises a first region 100, on which a coil module 102 (FIG. 9) is disposed. The first region 100 is of a substantially cylindrical construction. By this first region 100 a locating pin 96 is connected to the holding base 76.

A locating pin 96 further comprises a second region 104 that lies above the first region 100 and above the respective coil module 102. The second region 104 comprises in each case a bottom surface region 106, which is of a substantially planar construction and which is parallel to the holding base 76. This bottom surface region 106 has a surface normal that is parallel to the centre line 36.

The second region 104 further comprises a spherical surface region 108, wherein the envelope of the spherical surface regions 108 of all of the locating pins 96 is a spherical surface segment. A centre of the sphere belonging to this spherical surface segment lies on the centre line 36. This centre, which is indicated in FIG. 2 by the reference character 110, lies in particular at the centre of a convex bearing body 112, by means of which the rotor 28 is spherically mounted.

Seated on the respective locating pins 96 are coil modules 102, which are fundamentally of an identical construction.

A coil module 102 comprises a coil holder 114. The coil holder 114 in turn comprises a base element 116 and a top element 118. Disposed between the base element 116 and the top element 118 is an in particular hollow-cylindrical winding core 120. Onto this winding core 120 the respective coil 86 is wound with a plurality of windings 122. The top element 118 and the base element 116 are in this case so designed that they project beyond an outer boundary envelope of the coil 86 and hence cover the coil in an upward direction and in a downward direction.

The base element 116 (as well as the top element 118) is so designed that the requisite spacing from adjacent coils and from earthed parts is established by means of the corresponding air gap. For example, for this purpose the base element 116 comprises lateral lugs 117a, 117b, by means of which the base element 116 differs from a circular disk shape.

For example, a minimum spacing (air gap) of 3 mm from metal to metal is realized.

The coil holder 114 has an in particular cylindrical recess 124, which takes the form of a through-opening. The recess 124 forms a pin receiver for a locating pin 96, which may engage through the recess 124. By means of the recess 124 the coil module 102 is mountable onto the associated locating pin 96 in order to fasten the coil 86 to the stator 26.

The coil holder 114 is designed in the style of a cotton reel.

The coil holder 114 is in particular so designed that the coil 86 may be produced on the coil holder 114 automatically by means of a winding machine.

A coil axis 126 is oriented transversely and in particular at right angles to the base element 116 and to the top element 118. When a coil module 102 is fastened to the magnetic return body 74, the coil axis 126 is oriented substantially parallel to the centre line 36 and to the axis 98 of the corresponding locating pin 96. In this case, it coincides in particular with the axis 98 of the locating pin 96.

Disposed on the base element 116 of the coil holder 114 is a flange 128 that extends down from the base element 116. The flange 128 in this case has a direction of extent that is parallel to the coil axis 126. (The flange 128 in this case may itself be aligned parallel to the coil axis 126 or be disposed for example obliquely relative to the coil axis 126.) The flange 128 therefore projects beyond a bottom boundary plane 130 that is defined by the base element 116.

Seated on the flange 128 are a first web 132 and a second web 134. The first web 132 and the second web 134 are oriented for example parallel to one another. The two webs 132 and 134 are oriented transversely of, and in particular at right angles to, the coil axis 126. The two webs 132 and 134 project beyond a boundary surface of the coil 86 on the coil module 102.

The first web 132 and the second web 134 are seated on or in the vicinity of a bottom end of the flange 128.

The coil holder 114 with its base element 116 and its top element 118 is in particular of an integral construction. Furthermore, the flange 128 with the first web 132 and the second web 134 is disposed integrally on the coil holder 114. The coil holder 114 is manufactured in particular from a plastics material.

The first web 132 and the second web 134 are used to hold a first coil portion 136 and a second coil portion 138, wherein these two coil portions 136, 138 are oriented transversely and in particular at least approximately at right angles to the coil axis 126. The first coil portion 136 and the second coil portion 138 are moreover disposed at least approximately at the same height.

They preferably have an envelope plane that is oriented parallel to the contact printed circuit board 82 when the coil module 102 is positioned on the magnetic return body 174.

The first coil portion 136 and the second coil portion 138 are oriented transversely of the first web 132 and the second web 134. For example, the first coil portion 136 is oriented substantially at right angles to the first web 132 and the second web 134. The second coil portion 138 lies, not parallel, but at an angle to the first coil portion 136 and hence also at a small acute angle (for example in the order of magnitude of 30°) to the first web 132 and the second web 134. It may additionally be provided that the first web 132 is designed shorter than the second web 134.

Figure 6:
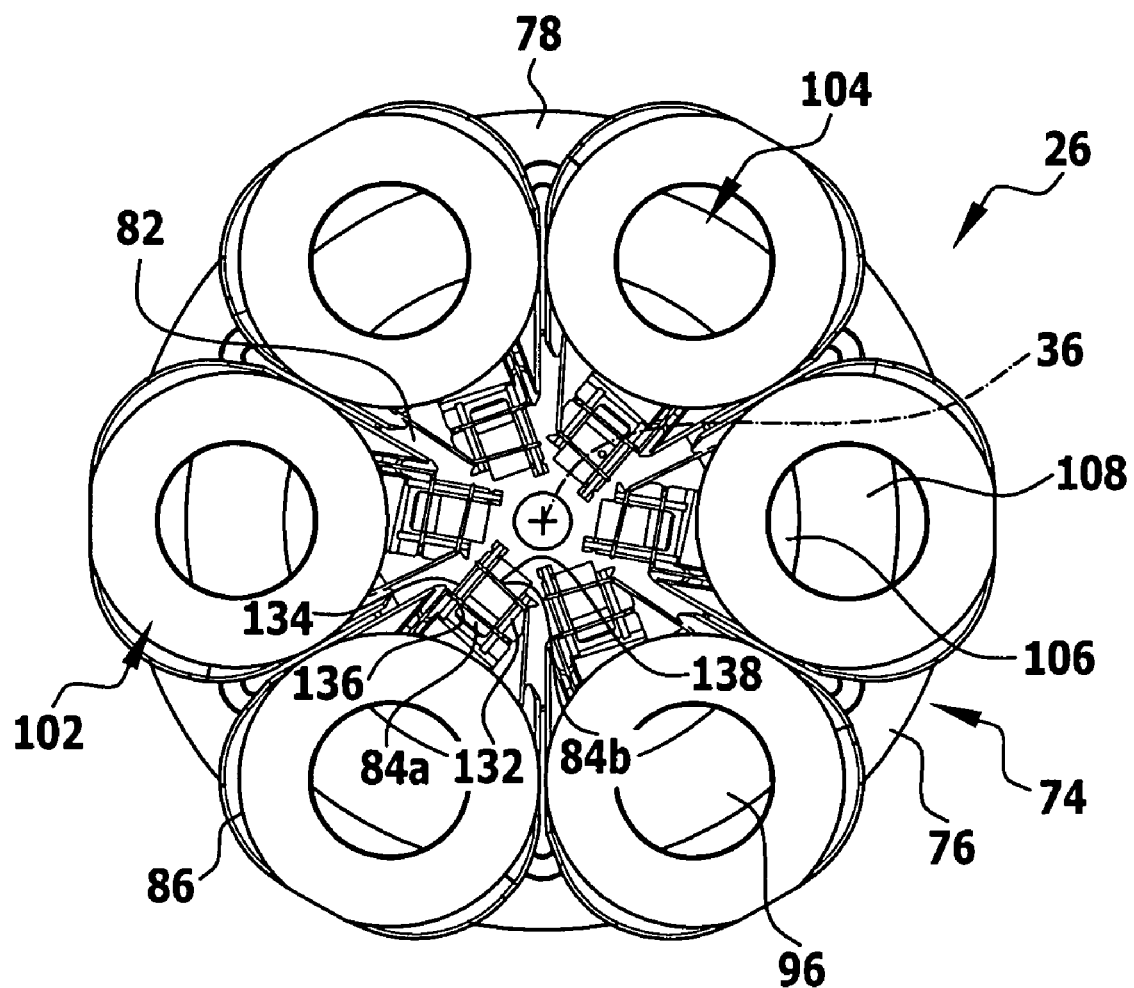
FIG. 6 shows a plan view of the (partial) stator according to FIG. 5 in direction A (from above)
Figure 7:
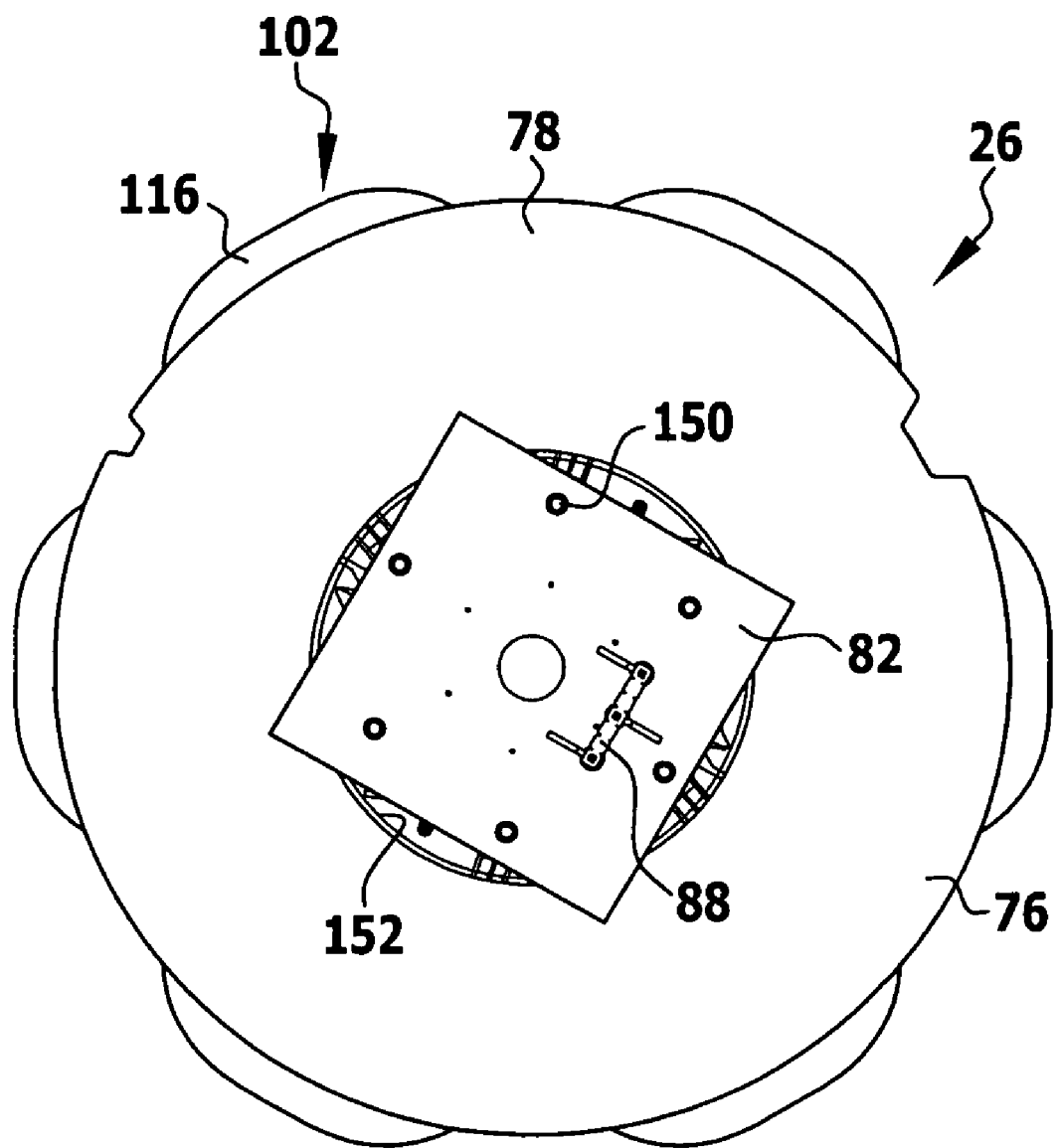
FIG. 7 shows a plan view of the (partial) stator according to FIG. 5 in direction B (from below)
Figure 8:
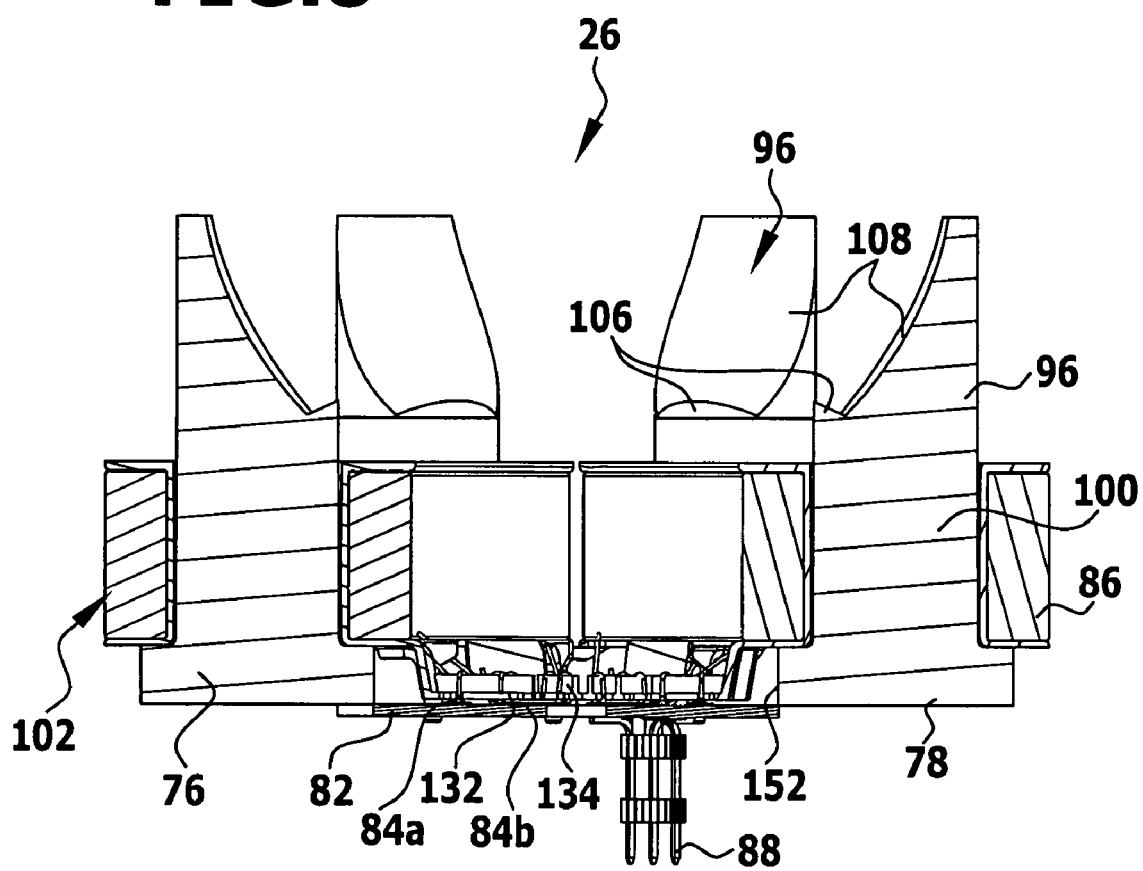
FIG. 8 shows a sectional view through the (partial) stator according to FIG. 5.

Given this construction, with the provision of a large contact surface it is possible to arrange a plurality of coil modules 102 distributed around the centre line 36 on the magnetic return body 74 (FIG. 6).

The first coil portion 136 lies in the vicinity of a first wire end 140 of the coil 86. The second coil portion 138 lies in the vicinity of a second wire end 142 of the coil 86.

The coil wire is fastened to the first web 132 and the second web 134 in each case by a winding 144a, 144b, 144c, 144d. Thus, the coil wire in the region of the first wire end 140 is fastened by the winding 144a to the first web 132. Leading from this winding is the first coil portion 136, which extends between the first web 132 and the second web 134. By the winding 144b the coil wire is then further fastened to the second web 134. From there, the coil wire runs to the coil holder 114.

In the region of the second wire end 142 the coil wire is fastened by the winding 144d to the second web 134. From this winding 144d the second coil portion 138, which lies between the first web 132 and the second web 134, runs to the winding 144c, by which the coil wire is fastened to the first web 132. From this winding 144c the coil wire then runs to the coil holder 114.

The first web 132 and the second web 134 each have recesses 145 for receiving the corresponding windings 144a, 144b, 144c, 144d.

Associated with the coil module 102 is an anti-rotation device 146, by which the coil module 102 may be fastened in a rotationally fixed manner to the magnetic return body 74. The anti-rotation device 146 for this purpose comprises (at least) one pin 148, which is seated on the flange 128 and projects downwards substantially parallel to the coil axis 126.

The contact printed circuit board 82 has a pin receiver 150 (FIG. 7), which is associated with the corresponding coil module 102 and into which the pin 148 is introduced, given correct positioning of the coil module 102 on the associated locating pin 96.

The holding base 76 has a recess 152. If the holding base 76 takes the form of ring 78, then the recess 152 is the ring recess. The flange 128 of the respective coil modules 102 is introduced into this recess 152. The first web 132 and the second web 134 and hence also the first coil portion 136 and the second coil portion 138 of the corresponding coil module 102 are therefore positioned in the recess 152. In a downward direction relative to the end wall 32 the recess 152 is delimited by the contact printed circuit board 82. The coil portions 136 and 138 lie adjacent, and are electrically connected, to the contact points 84a, 84b of the contact printed circuit board 82. The connection is established in particular by welding or soldering.

By the connection line or connection lines 88 in turn the electrical contact is established between the contact points 84a, 84b and the motor circuit 16.

To manufacture the stator 26, the magnetic return body 74 is manufactured in particular integrally from the compressed powder material.

Separately from this, the coil modules 102 are manufactured. In this case, in particular the coils 86 on the coil holders 114 are produced by winding by means of a winding machine.

The respective coil modules 102 are then mounted from above onto the locating pins 96 of the magnetic return body 74, and namely in such a way that the pins 148 of the coil modules 102 can engage into the pin receivers 150 of the contact printed circuit board 82 (which has previously been positioned on the magnetic return body 74). In this way, a correct alignment of the coil modules 102 is achieved.

The respective first coil portions 136 and second coil portions 138 are in this case, given appropriate dimensioning, positioned at the respective contact points 84a, 84b. The electric connection may then be effected from above by welding using a welding robot or by soldering.

Manufacture of the stator 26 may therefore be carried out with a high degree of automation.

Figure 10:
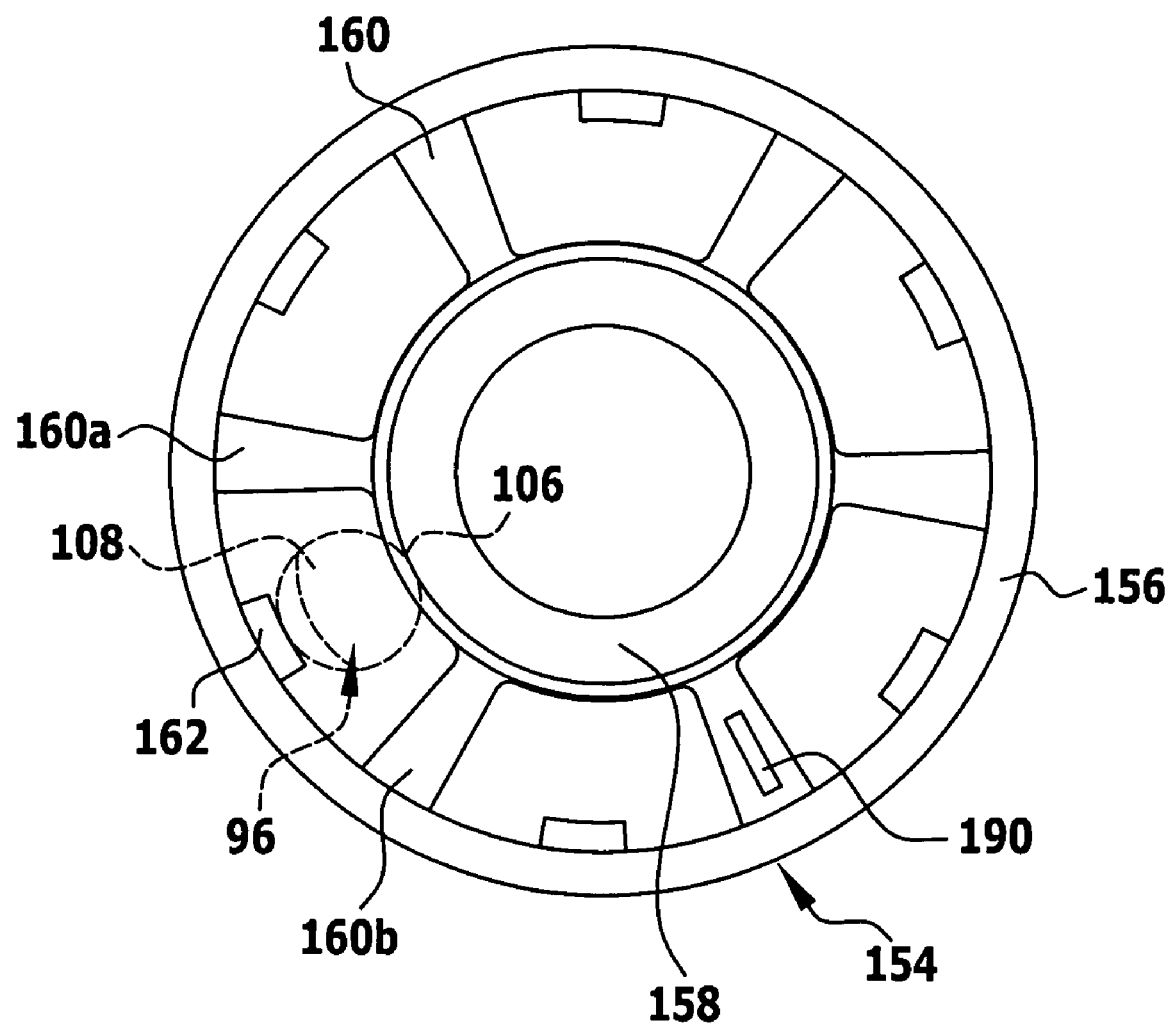
FIG. 10 shows a plan view of an embodiment of a top.

On the magnetic return body 74 having the coil modules 102 a top 154 is then mounted (FIG. 10), which is manufactured in particular from a plastics material.

The top 154 is for example of an integral construction. It comprises an annular element 156, which can be positioned on the magnetic return body 74. It can be mounted in particular onto the cover elements 108 of the coil modules 102. The annular element 156 is then positioned in the interior 22 of the first chamber 18.

Disposed inside the annular element 156 is an inner element 158. The inner element may be applied by corresponding abutment surfaces onto the bottom surface regions 106 of the locating pins 96. By means of the inner element 158 the interspace between the coil modules 102 around the centre line 36 is covered.

The inner element 158 is held on the annular element 156 by means of intermediate webs 160. The number of intermediate webs in this case corresponds to the number of coil modules 102. In the embodiment shown in FIG. 10, six intermediate webs 160 are provided in accordance with the six coil modules 102 provided. The intermediate webs 160 are uniformly spaced apart from one another, for example at an angular distance of 60°.

Between adjacent intermediate webs 160a, 160b positioning elements 162 are disposed on the annular element 156. These positioning elements 162 are used for abutment with the second regions 104 of the locating pins 96 at a side remote from the spherical surface region 108. They allow the top 105 to be centred on the magnetic return body 74.

Disposed between adjacent intermediate webs 160a, 160b there are in each case pole shoes 164 of the magnetic return device 73, which are manufactured from permeable material (FIG. 2). The number of locating pins 96 and the number of pole shoes 164 corresponds to the number of intermediate webs 160. The intermediate webs 160 serve as an abutment element for the pole shoes 164 and for the spatial separation of adjacent pole shoes 164.

The pole shoes 164 are manufactured for example from a compressed powder material, which in particular has iron grains that are electrically isolated from one another.

The pole shoes 164 have the shape of a segment of a spherical cup, i.e. they have opposing spherical surfaces. The stator 26 therefore has a spherical surface facing the rotor 28 in the region of the pole shoes 164.

The pole shoes 164 are in mechanical contact with the respective locating pins 96 in order to provide a permeable connection.

Disposed on the pole shoes 164 is a cover 166 (separating cap), which separates the stator 26 in a fluid-proof manner from a wet chamber of the circulation pump 10. The cover defines an interface between the stator 26 and the rotor 28.

The coil modules 102 with the respective coils 86 are disposed in relation to the centre line 86 below the rotor 28 and below the top 154, i.e. an envelope of the cover elements 118 lies below the rotor 28 and below the pole shoes 164.

The cover 166 forms a space 168 in the circulation pump 10, in which space the rotor 28 is positioned. This space 168 has the shape of a segment of a sphere corresponding to a hemisphere with a pole cap cut off.

The rotor 28 is spherically mounted by means of the bearing body 112. The bearing body 112 is of a convex construction with a spherical surface 170. The bearing body 112 is disposed in a rotationally fixed manner on a column 172. This column 172 is fixed on an outward bulge 173 of the cover 166 and extends above the inner element 158 with a coaxial alignment relative to the centre line 36. The bearing body 112 is manufactured for example from a ceramic material.

The rotor 28 comprises a concave bearing shell 174, which is positioned on the bearing body 112. By virtue of the bearing shell 174 and the bearing body 112 a spherical bearing is provided.

The rotor 28 is of a spherical design facing the stator 26, wherein a corresponding sphere centre coincides at least approximately with the centre 110.

The rotor 28 is designed as a magnetic field-generating rotor. For this purpose, it comprises one or more permanent magnets 176.

Formed between the cover 166 and the rotor 28 is an "air" gap 178 that in sections has the shape of a spherical cup. Through this gap 178 conveyed liquid may flow to the bearing body 112 in order to provide liquid lubrication of the spherical bearing (formed by means of the bearing body 112 and the bearing shell 174).

The air gap 178 is additionally in fluid-effective connection with the interior 56 of the circulation pump 10, in which interior the impeller 52 is rotatable.

The impeller 52 in this case is connected in a rotationally fixed manner to the bearing shell 174 and disposed in particular above the bearing body 112.

The electric motor 14 is electronically commutated. For this purpose, it comprises a position measuring device, which is disposed for example on the carrier 30 and is part of the motor circuit 16.

At least one sensor 180 is associated with this position measuring device and used to determine the rotor position in order to be able to control the coils 86 of the stator 26 in a corresponding manner.

The sensor 180 is for example a Hall-effect sensor.

The sensor 180 is disposed remote from the rotor 28. In the embodiment shown in FIG. 2, it is disposed on an additional carrier 182 that is seated below the coils 86.

It is also possible for the sensor 180 to be disposed on the carrier 30 in the second chamber 20.

For signal-effective coupling of the sensor 180 and the rotor 28, (at least) one flux guiding element 184 is provided as a flux guiding device 185, by means of which a rotor signal is transmitted from the rotor 28 to the remotely disposed sensor 180; the flux guiding element 184 effects a magnetic flux transmission from an outer side of the stator 26 (that faces the rotor 28) to the sensor 180.

The flux guiding element 184 is manufactured from a paramagnetic material and in particular from soft iron.

It comprises a signal pick-up region 186, which has an end 188 facing the rotor 28. This end 188 is of a spherical or cylindrical construction. It lies directly below the cover 166.

In particular, there is formed in an intermediate web 160 a for example slot-shaped recess 190 (FIG. 10), in which the signal pick-up region 186 is disposed.

Integrally connected to the signal pick-up region 186 is a conducting region 192, via which the flux signals may be supplied from the signal pick-up region 186 to the sensor 180.

The conducting region 192 bridges the gap between the signal pick-up region 186 and the sensor 180.

In the embodiment shown in FIG. 2, the conducting region 192 extends substantially parallel to the centre line 186 through the stator 26 to the sensor 180.

If the sensor 180 is constructed in the second chamber 20, then this conducting region 192 extends in a corresponding manner into the second chamber 20.

The flux guiding element 184 is designed in particular as a lamina having a first side and an opposite, second side, between which the flux guiding element 184 extends. The first side and the second side are in this case of a substantially planar design and lie parallel to one another. (In FIG. 2 the first side and the second side lie parallel to the drawing plane.)

The signal pick-up region 186 is preferably wider than the conducting region 192 in order to provide an optimized signal pick-up.

The flux guiding device 185 allows the sensor 180 to be positioned at a suitable point in the circulation pump 10; the sensor 180 need no longer be positioned in the direct vicinity of the rotor 28 in order to obtain an optimized signal pick-up, rather it may be positioned at the point that is suitable in particular for ease of manufacture.

According to the invention a circulation pump 10 is provided, in which one or more electronic power components 38 that have a high heat production may be cooled by means of conveyed liquid through thermal contact with the stator 26 (provided through the connection opening 92).

A stator 26 is provided, which is easy to manufacture. By means of the coil modules 102 the coils 86 may be manufactured in an automated manner by means of a winding machine. The coil modules 102 in turn may be contacted with the motor circuit 16 via the contact printed circuit board 82 in an automated manner, in particular by welding or soldering.

The fact that a flux guiding device 185 is associated with the (at least) one sensor 180 of the position measuring device of the electronically commutated electric motor 14 allows the sensor 180 to be disposed at an optimized position in particular with regard to manufacture of the electric motor and/or the circulation pump 10, wherein during operation of the electric motor 14 good signal level is provided.

The invention claimed is:

1. Coil module for a stator of an electric motor, comprising:
a coil holder;
a coil that is disposed on the coil holder;
a first web and a second web;
wherein:
situated between the first web and the second web are a first coil portion and a second coil portion for contacting with a motor circuit;
said first coil portion and said second coil portion comprise wire of the coil; and
the first coil portion and the second coil portion lie transversely to the first web and the second web.

2. Coil module according to claim 1, wherein the coil is wound on the coil holder.

3. Coil module according to claim 1, wherein the coil holder is designed in such a way that the coil can be manufactured on the coil holder by means of a winding machine.

4. Coil module according to claim 1, wherein the first coil portion lies in a region of a first wire end of the coil.

5. Coil module according to claim 1, wherein the second coil portion lies in a region of a second wire end of the coil.

6. Coil module according to claim 1, wherein at least one of the first coil portion and the second coil portion is fastened to at least one of the first web and second web by means of winding.

7. Coil module according to claim 6, wherein at least one of the first web and the second web have at least one recess for receiving the winding.

8. Coil module according to claim 1, wherein the first web and the second web lie substantially parallel to one another.

9. Coil module according to claim 1, wherein the first coil portion and the second coil portion lie transversely to a coil axis.

10. Coil module according to claim 1, wherein the first web and the second web are oriented transversely to a coil axis.

11. Coil module according to claim 1, wherein the first web and the second web differ in length.

12. Coil module according to claim 1, wherein the first coil portion and the second coil portion lie at an angle to one another.

13. Coil module according to claim 1, wherein the first coil portion and the second coil portion are electrically contactable from above with contact points.

14. Coil module according to claim 1, wherein the coil holder is designed in such a way that it is mountable onto a coil holder receiver of the stator.

15. Coil module according to claim 1, wherein the coil holder has a recess, into which a locating pin can be introduced.

16. Coil module according to claim 1, wherein the coil holder comprises a base element and a top element, which overlap the coil.

17. Coil module according to claim 16, wherein the first web and the second web are disposed on the base element.

18. Coil module according to claim 17, wherein there is disposed on the base element a flange, which has a direction of extent parallel to a coil axis and on which the first web and the second web are seated.

19. Coil module according to claim 1, wherein an anti-rotation device for rotational fixing on the stator is provided.

20. Coil module according to claim 19, wherein the anti-rotation device is formed by means of at least one of (i) one pin and (ii) one pin receiver.

21. Coil module according to claim 1, wherein the first web and the second web are seated integrally on the coil holder.

22. Coil module according to claim 1, wherein the coil holder is manufactured from a plastics material.

23. Coil module according to claim 1, wherein the coil holder has a winding core, which is of a cylindrical construction.

24. Stator for an electric motor, comprising:
a magnetic return body, on which at least one coil module is disposed, said coil module comprising:
a coil holder;
a coil that is disposed on the coil holder;
a first web and a second web;
wherein:
situated between the first web and the second web are a first coil portion and a second coil portion for contacting with a motor circuit;
said first coil portion and said second coil portion comprise wire of the coil; and
the first coil portion and the second coil portion lie transversely to the first web and the second web.

25. Stator according to claim 24, wherein the first coil portion and the second coil portion are electrically connected to respective contact points.

26. Stator according to claim 25, wherein the first coil portion and the second coil portion are connected to respective contact points by welding or soldering.

27. Stator according to claim 25, wherein the contact points are disposed on a printed circuit board.

28. Stator according to claim 27, wherein the printed circuit board is disposed below the magnetic return body.

29. Stator according to claim 27, wherein:
the printed circuit board has, associated with the at least one coil module, at least one pin receiver and/or at least one pin for forming an anti-rotation device, and
at least one pin of the coil module is introduced into the at least one pin receiver and/or the at least one pin of the printed circuit board is introduced into at least one pin receiver of the coil module.

30. Stator according to claim 24, wherein the magnetic return body has at least one locating pin, on which the at least one coil module is disposed.

31. Stator according to claim 30, wherein the magnetic return body has a plurality of locating pins, which are arranged distributed around an axis.

32. Stator according to claim 30, wherein the at least one locating pin comprises a first region, on which the associated coil module is seated, and a second region, which lies outside the coil module.

33. Stator according to claim 32, wherein a plurality of locating pins are provided, the second regions of which have as a common surface envelope a spherical surface segment.

34. Stator according to claim 30, wherein the magnetic return body has a holding base, on which the at least one locating pin is disposed.

35. Stator according to claim 34, wherein the holding base and the at least one locating pin are integrally connected to one another.

36. Stator according to claim 24, wherein the magnetic return body is manufactured from a compressed powder material.

37. Stator according to claim 36, wherein the powder material comprises iron grains that are electrically isolated from one another.

38. Stator according to claim 34, wherein the holding base has a recess, in which lie the first web and the second web of the at least one coil module.

39. Stator according to claim 34, wherein the holding base takes the form of a ring.

40. Electric motor, comprising:
- a rotor; and
- a stator, said stator comprising a magnetic return body, on which a plurality of coil modules are disposed, said coil modules comprising:
  - a coil holder;
  - a coil that is disposed on the coil holder;
  - a first web and a second web;
- wherein:
  - situated between the first web and the second web are a first coil portion and a second coil portion for contacting with a motor circuit;
  - said first coil portion and said second coil portion comprise wire of the coil; and
  - the first coil portion and the second coil portion lie transversely to the first web and the second web.

41. Electric motor according to claim 40, wherein the rotor by means of one or more permanent magnets is a magnetic field-generating rotor.

42. Electric motor according to claim 40, wherein the rotor is positioned above the coils.

43. Electric motor according to claim 40, wherein the rotor is spherically mounted.

44. Electric motor according to claim 40, wherein the stator is of a spherical design at least in segments facing the rotor.

45. Electric motor according to claim 44, wherein one or more pole shoes are disposed on a top on the stator.

46. Electric motor according to claim 44, wherein the rotor is of a spherical design facing a spherical region of the stator.

47. Circulation pump, which has an electric motor, comprising:
- a rotor; and
- a stator, said stator comprising a magnetic return body, on which a plurality of coil modules are disposed, said coil modules comprising:
  - a coil holder;
  - a coil that is disposed on the coil holder;
  - a first web and a second web;
- wherein:
  - situated between the first web and the second web are a first coil portion and a second coil portion for contacting with a motor circuit,
  - said first coil portion and said second coil portion comprise wire of the coil; and
  - the first coil portion and the second coil portion lie transversely to the first web and the second web.

* * * * *